Jan. 10, 1950 G. L. USSELMAN 2,494,321

FREQUENCY SHIFT KEYING STAGE

Filed June 27, 1945 3 Sheets-Sheet 1

INVENTOR
GEORGE L. USSELMAN.
BY H. S. Grover
ATTORNEY

INVENTOR
GEORGE L. USSELMAN.
BY H. S. Grover
ATTORNEY

FREQUENCY SHIFT KEYING STAGE
Filed June 27, 1945 3 Sheets-Sheet 3
FIG. 5.
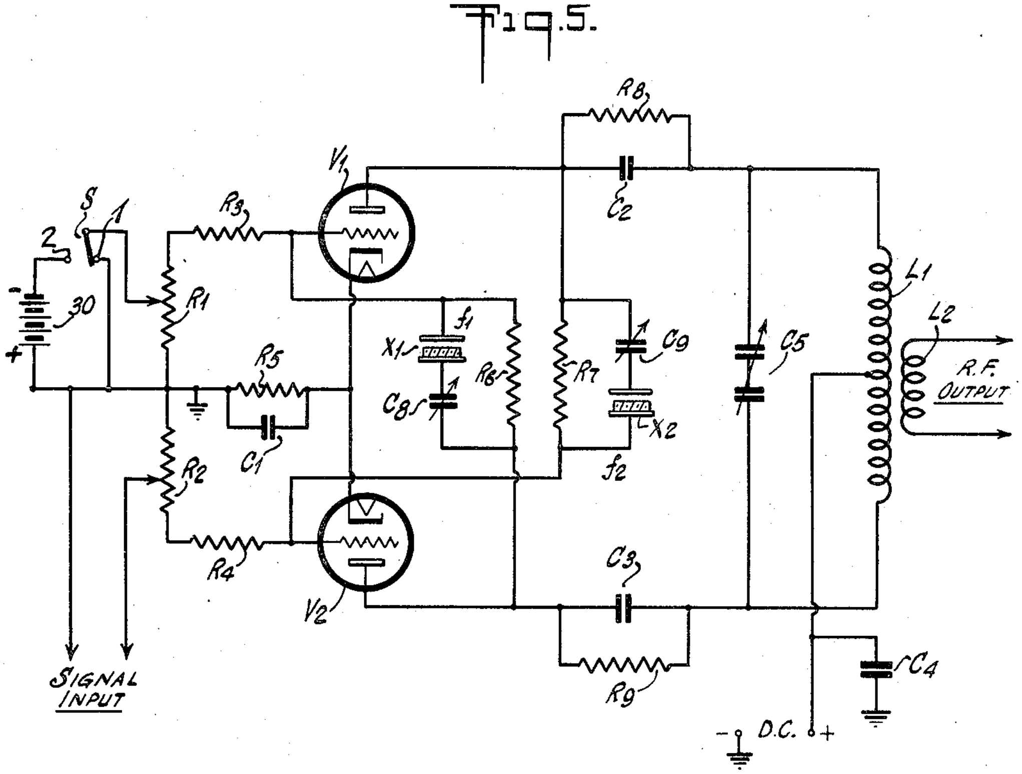
FIG. 6.
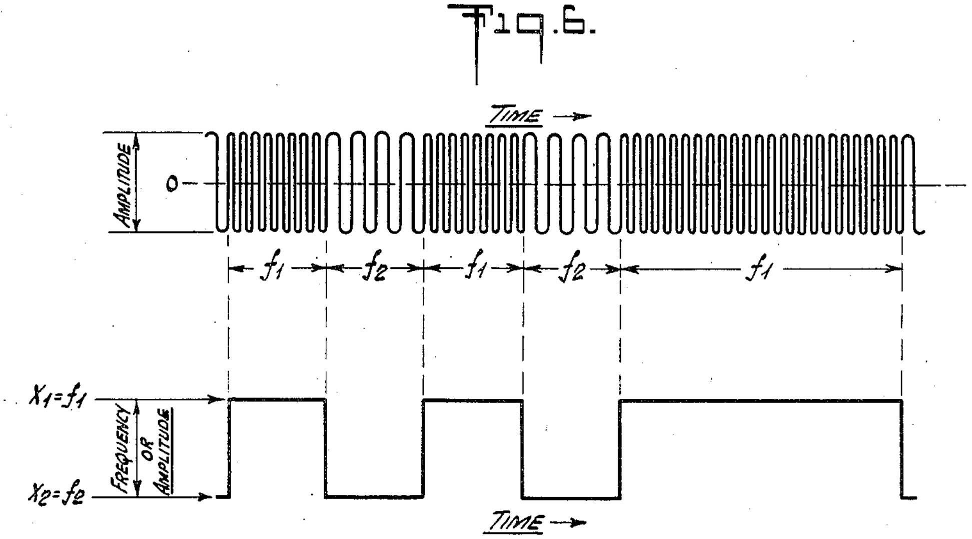
FIG. 7.
INVENTOR
GEORGE L. USSELMAN.
BY H. S. Grover
ATTORNEY Patented Jan. 10, 1950

2,494,321

UNITED STATES PATENT OFFICE 2,494,321

FREQUENCY SHIFT KEYING STAGE

George L. Usselman, Port Jefferson, N. Y., assignor to Radio Corporation of America, a corporation of Delaware Application June 27, 1945, Serial No. 601,797

16 Claims. (Cl. 250—36)

Figure 1:
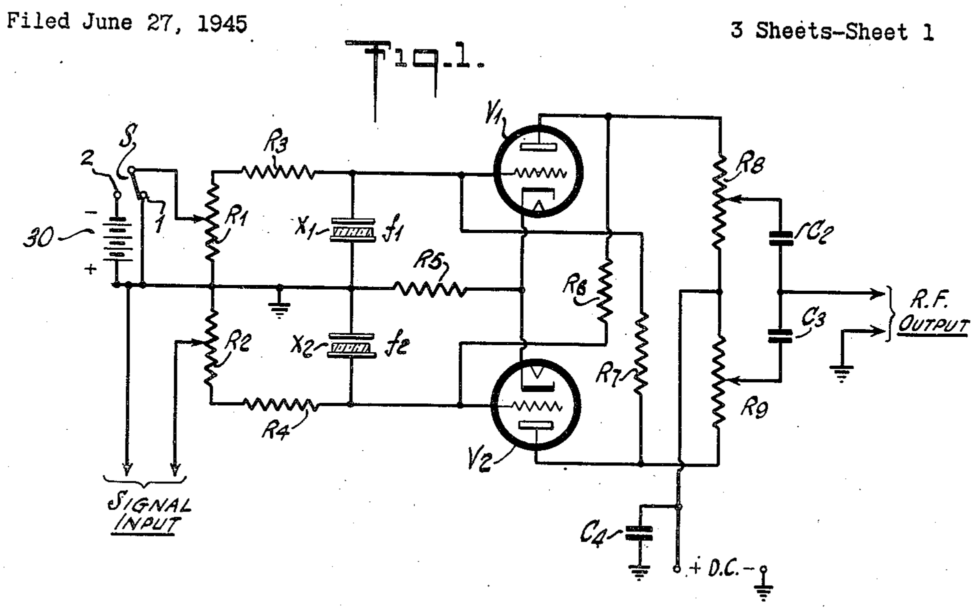

This application discloses an improved signalling system wherein oscillatory energy is generated and modulated as to frequency in accordance with signals. The signals may represent telegraphy markings, or, facsimile signals may be used. The invention disclosed is especially useful in telegraphy and facsimile systems where signalling is accomplished by developing carrier energy which is shifted from one frequency which may be designated "space" or "no signal" condition to another frequency designated "mark" and representing "signal on" condition. Systems of this type are often referred to in the radio art as spaced wave telegraphy or frequency shift telegraphy.

Where intelligence is to be transmitted by shifting the frequency of energy between two values in accordance with signals the arrangement must be such that the frequency of the current can be changed abruptly and yet it is important that the current at the changed frequencies represening "mark" and "space" be of substantially fixed frequency and further that the extent of shift in frequency be substantially constant during operation. In many systems known heretofore there is a tendency for the currents to drift in frequency. An object of my present invention is to improve frequency shift signalling in this respect. This is accomplished by using two oscillation generators of the crystal controlled type in an improved circuit arrangement, such that the output frequency is controlled by one or the other of the two crystal oscillators operating at different frequencies, and this control is in accordance with signals.

Another object of the present invention is to provide oscillations the frequency of which may be readily shifted by signals from a first fixed frequency by a fixed amount to a second fixed frequency and vice versa. This object is attained by providing an oscillator arrangement having accurate frequency control but having two degrees of freedom so that the oscillator arrangement frequency of operation may be flopped or keyed from one stable frequency to the other and vice versa by telegraph or similar signals.

Frequency shift keying systems known in the art which make use of crystal controlled oscillators are somewhat complicated in structure and operation. An object of the present invention is to provide a simplified and efficient frequency shift keying system wherein two crystal controlled oscillators produce the mark frequency and space or no signal frequency. This object is attained by provision of the combination of a keying circuit and two crystal oscillators, in which most of the circuit elements serve a dual purpose, to form one oscillator with two stable points of oscillation but which operates on only one frequency at one time.

The manner in which the above objects and others are attained will now be described in detail. In this description reference will be made to the attached drawings wherein Figs. 1 to 5 inclusive illustrate the essential features of a frequency shift keying stage arranged and operated in accordance with my invention. The curves of Figs. 6 and 7 illustrate respectively the nature of the output of my frequency shift system and of a receiver responsive to signals transmitted therefrom.

The tubes V1 and V2 are the oscillation generating and keying tubes. Tube V1 has its control grid coupled to its cathode by a potentiometer resistor R1, resistor R3 and resistor R5. The control grid of tube V2 is somewhat similarly connected to its cathode by a potentiometer resistor R2, resistor R4 and the common resistor R5. The anode of V1 is connected to the control grid of V2 by resistor R6, while the anode of V2 is connected to the control grid of tube V1 by resistor R7. Output impedances R8 and R9 are coupled between the anodes of tubes V1 and V2. A point on these resistors is connected to a direct current source not shown but shunted by capacitor C4 large enough to bypass voltages of the keying frequency, i. e., of the frequency of the pulses at the anode ends of the output impedances R8 and R9. The outputs of these tubes are combined in parallel by coupling capacitors C2 and C3. The biases for the control grids of tubes V1 and V2 are determined by the resistors R1, R2, R3, R4, R6, R7 and R5. Signals (A. C. and D. C. pulses) are superimposed on the bias of tube V2 while the direct current potential on the grid of tube V1 may be made more negative by connecting switch S to contact 2 or made less negative by connecting switch S to contact 1. Crystal X1 of a first frequency $f1$ is connected between the grid of tube V1 and the grounded end of resistor R5, while crystal X2 of a second frequency $f2$ is connected between the grid of tube V2 and the grounded end of resistor R5.

Disregarding for the moment the operation of the crystals in the circuits, it will be noted that the tubes V1 and V2 are in some respects arranged in accordance with the tripping circuit disclosed in Finch U. S. Patent #1,844,950, dated Feb. 16, 1932. In these tripping circuits the arrangements are such that as current flows through say tube V1, the potential on the anode thereof will drop because of the increased potential drop in resistor R8 and this decrease in potential is supplied by resistor R6 to the grid of tube V2 so that current through tube V2 is reduced or cut off and the potential on the anode of tube V2 rises because there is less potential drop in resistor R9 and the resistor R7 applies a more positive voltage to the grid of tube V1. The action is cumulative so that then all of the current is switched through tube V1 and current through tube V2 is cut off. If now for some reason current flow through V2 is initiated by similar action the current is all switched through tube V2 and tube V1 is cut off.

The tubes V1 and V2 are controlled as to conductivity by controlling the grid potentials. In one embodiment the bias on the tube V1 is made sufficiently negative to switch the current through tube V2 in the absence of signal input or in the "space" condition. The grids are at different potentials due to the potentiometer action of resistors R7, R3, R6, R4, and R1 and R2. The required negative grid bias on V1 to switch the current through V2 may be obtained by the potential drop in resistors R1 and R3 due to current from resistor R7 and the cathode current in resistor R5. If this bias is insufficient, it may be supplemented by negative potential from a source 30 with the switch S on contact 2. However, sufficient bias is usually obtained without the source 30. It can be seen that the grids of tubes V1 and V2 are at different positive potentials and the grid of tube V1 is least positive. At no signal the grid of tube V1 is less positive because R1 is partly short circuited through S and contact 1, or has a negative potential applied to it through S and the 2 contact. If during keying the bias on the grid of V1 is so negative that the marking potentials can not switch the current through tube V1 the switch S is put on contact 1 as shown, to short circuit part of resistance R1 and make the grid of V1 less negative.

Now when a negative potential such as caused by a code signal is applied to the control grid of tube V2 this tube is cut off or current therethrough reduced and through the action described above the current is switched through tube V1. This causes a drop in potential in the anode of tube V1 and this drop in potential appears as modulation or shifts the frequency of the radio output developed as described hereinafter.

If the negative potential applied to tube V1 is so great that it is not overcome by the negative signal potential then the switch S may be moved to contact 1 to reduce the negative potential on the gride of tube V1 so that keying can take place. Alternating current signal input may be used as well as direct current because the negative alternations of the alternating current make the grid of tube V2 more negative so that current is switched from tube V2 to tube V1 as described above. The positive alternations of the alternating current impulses have no effect because the current is already switched through tube V2 which is then operating at saturation. In other words, the manner of keying here as described briefly above is similar to that disclosed in my U. S. application Serial #535,829, dated May 16, 1944.

The crystal X1 is connected between the grid and cathode of tube V1 and this crystal is dimensioned, by grinding, to operate at a desired frequency b1 which may also represent "space" and/or no signal in the system. A crystal X2 is similarly connected between the grid and cathode of tube V2 and this crystal is dimensioned to operate at a second frequency separated from the first frequency by several to several hundred cycles. This frequency may represent "marking" or "signal on condition".

The tubes V1 and V2 as connected in Fig. 1 (and also Fig. 4) are oscillation generators of a somewhat modified Miller type wherein oscillations take place by virtue of feedback mostly through the grid to cathode capacity. Since both cathodes are connected together they operate to drive each other. Looking at it another way, since both cathodes are operated above ground by means of resistor R5 then the ground end of crystals X1 and X2 may be said to have some anode coupling by which the feedback takes place to cause oscillations.

In operation, it is assumed that the keying circuit is on space or no signal and tube V1 is biased to cutoff while tube V2 carries current. Crystal X2 oscillates strongly and the radio frequency output is by way of anode resistor R9 and capacitor C3. Crystal X1 is at the same time forced to oscillate weakly at the same frequency as X2, by feedback through resistor R7 and the anode or cathode feedback. This assumes that crystal X1 is dimensioned for a frequency of not more than a few hundred cycles different from that of crystal X2. This permits tube V2 to generate the used oscillations because crystal X2 oscillates strongly and a radio frequency output of the frequency of operation of crystal X2 is supplied by way of resistor R9 and capacitor C3 to the output leads. Tube V1 being cut off does not have any output.

Now as the keying cycle advances so a mark appears the grid of tube V2 is made less positive or more negative and by the action described above the current is tripped through tube V1 and cut off in tube V2. In this case, crystal X1 oscillates strongly at its own frequency and the output is now by way of anode resistor R8 and condenser C2. Crystal X2 in the meantime is forced to oscillate weakly at the same frequency as crystal X1 by feedback through resistor R6. However, tube V2 will have no output since it is cut off. It will be noted that in the "no signal" and "space" condition the output of the system is at f2 not at one frequency for "space" only and some other frequency, perhaps between f2 and f1, for "no signal," as in many frequency shift systems. In brief, the oscillation circuits are not entrained, but each tube oscillates at the frequency of its own oscillatory circuit.

Figure 2:
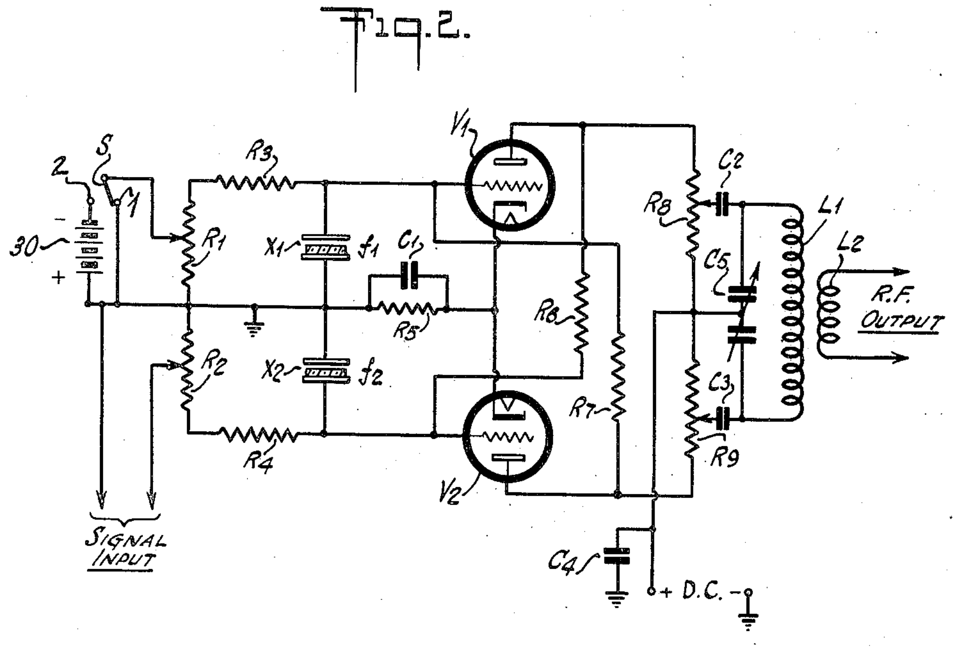

The embodiment in Fig. 2 is similar to the arrangement of Fig. 1 in many respects. However, in Fig. 2 the output impedances R8 and R9 are coupled by capacitors C2 and C3 to a tuned circuit C5L1, in turn coupled to the output inductance L2.

The tuned circuit C5L1 of Fig. 2 serves two purposes. It supplies the inductive reactance necessary for the Miller type of oscillations, and it acts somewhat as a filter or flywheel circuit to reduce transient oscillations during the time when the signal is keyed from space frequency to mark freqency and vice versa. The tubes V1 and V2 as connected in Fig. 2 (and also Fig. 3) then are oscillator generators of the Miller type, wherein oscillation takes place by virtue of feedback through the tube grid to plate capacity and the systems oscillate at the frequencies f1 and f2 respectively.

Figure 3:
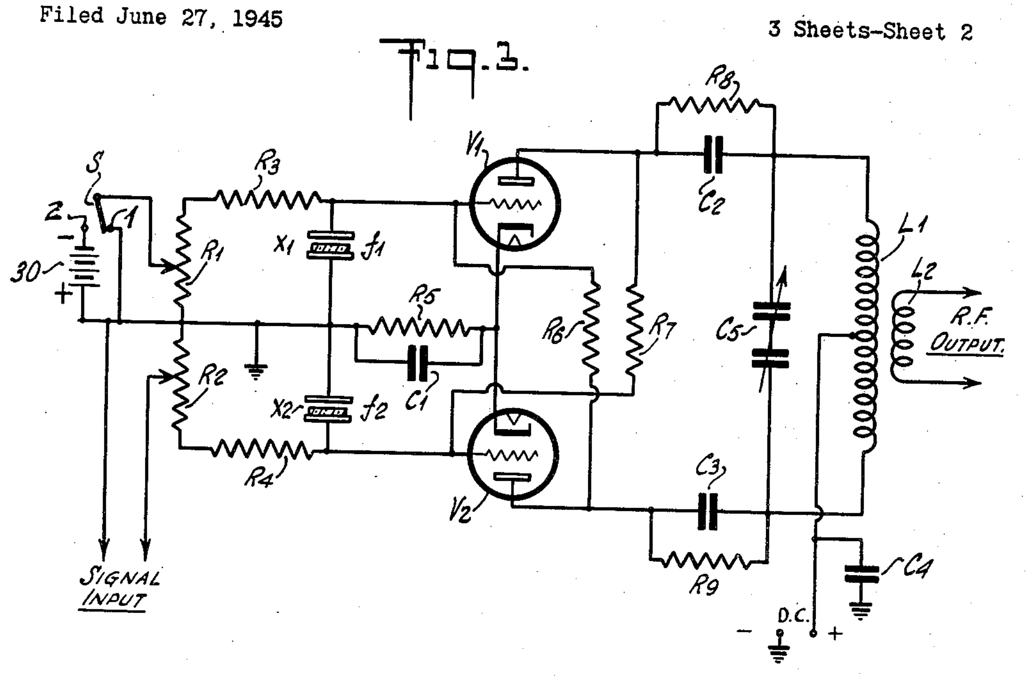

The embodiment of Fig. 3 has features included in the arrangements of Figs. 1 and 2. In Fig. 3 the tuned output circuit C5L1 is a more integral part of the tripping circuit because the ends of the tuned circuit C5L1 are connected more directly to the anodes of tubes V1 and V3 through anode load resistors R8 and R9. These resistors are shunted for radio frequencies by the bypassing and coupling capacitors C2 and C3.

The purpose of the load resistors R8 and R9 is as in the prior modifications to load the outputs of the tubes V1 and V2 for the usual purposes including the provision of varying potentials at these anodes which take part in the tripping action when the varying potentials are fed back through resistances R7 and R6 to the tubes V1V2. In this circuit the tripping current flows through the coil L1 of the tuned circuit. Fig. 3 and Fig. 2 are very much alike. They vary only in the manner in which the tank circuit C5L1 is coupled to the anodes and the manner of D. C. current path. The tank circuit is used for the same purposes in both cases.

Figure 4:
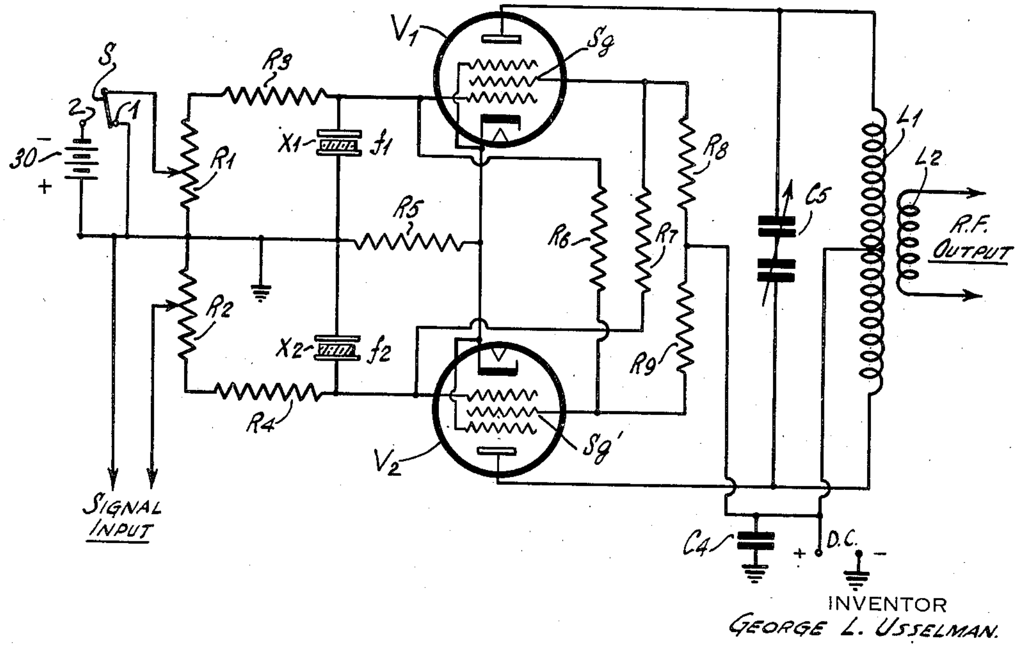

In Fig. 4 which is a modification of the arrangement of Figs. 1, 2 and 3, the tuned output circuit C5L1 is coupled directly to the anodes of the tripping tubes V1V2. The tripping tubes V1V2 are of the multi-grid type being pentodes in the embodiment illustrated. The load impedances R8 and R9 are now connected between the screen grids S*g* and S'*g* which serve as the anodes in this embodiment. The cross-coupling resistors R6 and R7 couple the grid-anodes of tubes V2 and V1 to the control grids of tubes V1 and V2 to provide the tripping action described hereinbefore. The anode electrodes are electronically coupled to the electrode systems in the tubes serving for the generation of oscillations and carrying out the tripping action as controlled by the signal input. In other words, the output circuit C5L1 is electronically coupled to the oscillator circuits. The oscillator circuits including cathodes, control grids and the screen grids, that is, the grid-anodes, of tubes V1 and V2 in Fig. 4 operate in a manner similar to that of Fig. 1. However, the tank circuit in this case serves the same purposes as those pointed out for Figs. 2 and 3. The generating circuit in the embodiment of Fig. 4, like that of Fig. 1, is a modified Miller type generator, the feedback coming from the cathodes since both tubes have their cathodes coupled together. Another way to look at it is that since the cathodes are above ground in potential, caused by the current in R5, then the ground ends of crystals X1 and X2 have a certain amount of coupling to the anodes.

In the embodiment of Fig. 5 the output circuit is substantially like the output circuit of Fig. 3. In this embodiment, however, the crystals X1 and X2 are no longer coupled between the control grids and cathodes of the respective tubes V1 and V2. In Fig. 5 the crystal electrode X1 is connected in the feedback coupling between the anode of tube V2 and the control grid of tube V1, while the crystal X2 is connected in the feedback coupling between the anode of tube V1 and the control grid of tube V2. The crystals X1 and X2 in the embodiment illustrated shunt the resistances R6 and R7 respectively and are respectively in series with variable capacitors C8 and C9. These condensers may be adjusted to feedback excitation from the anode of one tube to the grid of the other tube or may be adjusted to neutralize the system. For example, if glass or inactive quartz were used in Fig. 5 the circuit may oscillate unless the neutralizing condensers C8 and C9 are adjusted to neutralize the plate to grid feedback in tubes V1 and V2. Once this neutralized condition is secured then the active quartz plates can be inserted and normal operation will be obtained. This circuit is a more active oscillator than the other circuits of this invention, and stronger oscillations consequently may be obtained.

The operation of the arrangement of Fig. 5 is similiar in many respects to that of the preceding embodiments, but differ therefrom as follows. In this embodiment the crystals X1 and X2 act as filters in the excitation feedback circuit, that is, crystals X1 and X2 are in parallel with the resistors R6 and R7 respectively. Capacitors C8 and C9, in series with crystals X1 and X2 respectively, are for the purpose of adjusting the feedback excitation through crystals X1 and X2. The capacitors C8 and C9 may also be used as neutralizing condensers to prevent oscillation except at the crystal frequencies. Then the capacitor C8 is adjusted to neutralize the effect of the capacity between the plate and grid electrodes of X2, while the capacitor C9 is adjusted to neutralize the capacity between the plate and grid electrodes of crystal X1. It is to be noted that the radio frequency circuits here are set up in combination with the tripping circuit in such a manner that each can function without interfering with the action of the other. Various modifications in the embodiments shown may be made. For example, the crystals X1 and X2 may be connected between the anode and grid of tubes V1 and V2 respectively. When so connected oscillation would be in accordance with the Pierce principle.

In all embodiments the crystals are ground for the mark and space frequencies usually one or more hundred cycles apart. The spacing or difference frequency is not critical, but if the frequencies of the crystals are too widely separated then the crystal oscillations will start and stop with each change of the tripping circuit and this usually causes slow keying response so that the keyed high frequency energy builds up slowly at each switching operation.

Figs. 6 and 7 show these characteristics. Fig. 6 represents the R. F. or A. C. output voltage between ground and the point between C2 and C3 in Fig 1, and the output voltage across coils L1 or L2 in Figs. 2, 3, 4, and 5. This output as represented in Fig. 6 is a sine wave of changed or keyed frequency having substantially constant amplitude in which $f1$ and $f2$ may represent high and low frequencies of say 1,000,300 and 1,000,000 cycles. The difference in frequency may be as small as 50 cycles or it may be as high as 1000 cycles. Either $f1$ or $f2$ may be the higher frequency. The frequency range of crystals X1 and X2 may be from about 100,000 cycles up to several million cycles per second.

Fig. 7 represents an FM receiver output that is set to receive the radio frequency signals from the circuits of Figs. 1, 2, 3, 4, and 5. In Fig. 7 I show the changes in amplitude of the receiver output according to the changes in the frequency of the transmitted signal. It may be noted that the upper horizontal line in Fig. 7 represents one of the frequencies, say $f1$, and the lower horizontal line represents the other frequency, say $f2$. The up and down lines are quite steep but they actually have some slope because the change in frequency should not be and is not instantaneous. Too sudden changes in frequency are not desirable because they cause wide dispersion of side frequencies. The tank circuit of Figs. 2, 3, 4, and 5 acts as a flywheel to prevent too sudden changes in frequency.

What is claimed is:

1. In a signalling system in combination, two electron discharge tubes each having a control electrode, a cathode and an anode, means for applying operating potentials to the electrodes of the tubes including impedances cross-coupling the anode of one tube to the control electrode of the other tube, and the anode of the other tube to the control electrode of the one tube so that variations of the potential on the anode of one tube causes similar variations of the potential on the control electrode of the other tube and current initiated in one tube causes the current to be tripped to said one tube and the other tube to be cut off and vice versa, means for establishing feedback between the input and output of each tube so that each tube also operates as a generator of radio frequency currents of different frequencies, and connections to an electrode of one of said tubes to switch the current from one to the other thereof in accordance with signals.

2. In a signalling system, two electron discharge tubes each having a control electrode, a cathode and an anode, connections for applying operating potentials to the electrodes of the tubes including impedances coupling the anode of one tube to the control electrode of the other tube, and the anode of the other tube to the control electrode of the one tube so that variations of the potential on the anode of one tube cause similar variations of the potential on the control electrode of the other tube and a predetermined maximum current is caused to flow in one tube while a predetermined minimum current flows in the other tube and vice versa, means including two piezo electric crystals one coupling the tube electrodes of each tube in regenerative circuits so that each tube also operates as a generator of radio frequency current, the said currents being of different frequencies, and connections to an electrode of one of said tubes to switch the current from one to the other thereof in accordance with signals.

3. In a signalling system in combination, two electron discharge tubes each having a control electrode, a cathode and an anode, connections for applying operating potentials to the electrodes of the tubes including impedances cross-coupling the electrodes of the tubes so that when the potential on an electrode of one tube varies the potential on the corresponding electrode of the other tube varies in the opposite direction and causes maximum current to flow in one tube and minimum current to flow in the other tube and vice versa, means including two piezo electric crystals one coupling the electrodes of each tube in a regenerative circuit so that each tube also operates as a generator of radio frequency current, connections to the control electrode of one of said tubes to switch the current from one to the other thereof in accordance with signals, and an output circuit coupled to the anodes of both tubes.

4. In a signalling system, two electron discharge tubes each having a control electrode, a cathode and an anode, biasing impedances connecting the control electrode of each tube to the cathode of each tube for applying thereto biasing potentials one of which is less positive than the other, connections for applying direct current potentials to the anodes of the tubes including a source of direct current potential, impedances cross-coupling the anode of one tube to the control electrode of the other tube, and the anode of the other tube to the control electrode of the one tube so that when the potential on the anode of one tube rises, the potential on the control electrode of the other tube rises and current is tripped to said other tube and the one tube is cut off and vice versa, circuits coupling the electrodes of each tube in an independent high frequency generating circuit, a crystal in each of said circuits dimensioned to operate at a different frequency, and connections to the control electrode of one tube to control the bias thereon in accordance with signals.

5. In a signalling system, two electron discharge tubes each having a control electrode, a cathode and an anode, biasing impedances connecting the control electrode of each tube to the cathode of each tube for applying thereto biasing potentials one of which is less positive than the other, impedances cross-coupling the anode of one tube to the control electrode of the other tube, and the anode of the other tube to the control electrode of the one tube, means for applying direct current potentials to the anodes of the tubes, the potentials and connections being such that when current is initiated in one tube the current is tripped to said one tube and the other tube is cut off, circuits coupling the electrodes of each tube in a high frequency generating circuit, a crystal in each of said generating circuits dimensioned to operate at a different frequency, and an output circuit coupled to said tubes.

6. In a signalling system, two electron discharge tubes each having a control electrode, a cathode and an anode, impedances cross-coupling the anode of one tube to the control electrode of the other tube, and the anode of the other tube to the control electrode of the one tube, means for applying operating potentials to the electrodes of the tubes, the potentials and connections being such that when current is initiated in one tube the current is tripped to said one tube and the other tube is cut off and vice versa, means for establishing feedback between the anode and control electrode of each tube so that each tube also operates as a generator of radio frequency currents, a crystal tuned to a first frequency in the generating circuit of one tube, a crystal tuned to another frequency in the generating circuit of the other tube, connections for applying pulses of current representing signals to the control electrode of one tube, and an output circuit coupled to the anodes of the tubes.

7. In a signalling system, two electron discharge tubes each having a control electrode, a cathode and an anode, impedances coupling the anode of one tube to the control electrode of the other tube, and the anode of the other tube to the control electrode of the one tube, means for applying operating potentials to the electrodes of the tubes, the potentials and connections being such that when there is a predetermined maximum current in one tube there is a predetermined minimum current in the other tube and vice versa, a first crystal coupling the control electrode of one tube to the cathode of said one tube, a second crystal operating at a different frequency coupling the control electrode of the other tube to the cathode of said other tube, the arrangement being such that each tube is in an oscillation generating circuit, an output circuit coupled to output electrodes of both tubes and connections to an electrode of one of said tubes to switch the current from one to the other thereof in accordance with signals.

8. In a signalling system, two electron discharge tubes each having a control electrode, a cathode and an anode, biasing impedances connecting the control electrode of each tube to the cathode of each tube for applying thereto biasing potentials one of which is less positive than the other, impedances cross-coupling the anode of one tube to the control electrode of the other tube, and the anode of the other tube to the control electrode of the one tube, means for applying direct current potentials to the anodes of the tubes, the potentials and connections being such that when current is initiated in one tube the current is tripped to said one tube and the other tube is cut off, circuits coupling the electrodes of each tube in a high frequency generating circuit, a crystal in each of said generating circuits dimensioned to operate at a different frequency, and a tuned output circuit coupled to said tubes.

9. In a signalling system, two electron discharge tubes each having a control electrode, a cathode and an anode, biasing impedances connecting the control electrode of each tube to the cathode of each tube for applying thereto biasing potentials one of which is less positive than the other, impedances cross-coupling the anode of one tube to the control electrode of the other tube, and the anode of the other tube to the control electrode of the one tube, means for applying direct current potentials to the anode of the tubes, the potentials and connections being such that when current is initiated in one tube the current is tripped to said one tube and the other tube is cut off, circuits coupling the electrodes of each tube in a high frequency generating circuit, two crystals dimensioned to operate at different frequencies, means coupling one crystal between the control electrode of one tube and the anode of the other tube, means coupling the other crystal between the control electrode of said other tube and the anode of said one tube, and an output circuit coupled to the anodes of the tubes.

10. In signalling apparatus in combination, a locking circuit comprising two tubes each having input and output electrodes arranged in circuits including potential supply means in such a manner that when current is maximum in one tube, it is minimum in the other tube and vice versa, means for applying a control potential to an electrode of one of said tubes which varies in accordance with signals to control the state of conductivity of said tubes, a regenerative circuit coupling the electrodes of one of said tubes in an oscillation generating circuit operating at a first frequency, a second regenerative circuit coupling the electrodes of the other of said tubes in an oscillation generating circuit operating at a second frequency, and an output circuit coupled to the output electrodes of both of said tubes.

11. Signalling apparatus as recited in claim 10 wherein said tubes each have two electrodes serving as output electrodes one output electrode of each tube being in said first circuits, the other output electrode of each tube being coupled to said last circuit.

12. In signalling apparatus in combination, a locking circuit comprising two tubes each having input and output electrodes arranged in circuits including potential supply means in such a manner that when current is maximum in one tube, it is minimum in the other tube and vice versa, a signal potential source coupled to an electrode of one of said tubes to vary the potential thereon in accordance with signals to control the state of conductivity of said tubes, a regenerative circuit coupling the electrodes of one of said tubes in an oscillation generating circuit, a frequency stabilizing reactance, in said regenerative circuit, tuned to a first frequency, a second regenerative circuit coupling the electrodes of the other of said tubes in an oscillation generating circuit, a frequency stabilizing reactance, in said second regenerative circuit, tuned to operate at a second frequency, and an output circuit coupled to the output electrodes of both of said tubes.

13. Signalling apparatus as recited in claim 12 wherein said frequency stabilizing reactances are crystals respectively operating at the first and second frequencies.

14. Signalling apparatus as recited in claim 12 wherein said output circuit is tuned.

15. Apparatus as recited in claim 12 wherein said reactances are crystals and wherein said crystals are coupled one between an output electrode of one tube and an input electrode of the other tube and the other between an output electrode of said other tube and an input electrode of said one tube.

16. In signalling apparatus in combination, a locking circuit comprising two tubes each having input and output electrodes including a control grid and cathode arranged in circuits including potential supply means, including a fixed bias source for the control grid of one tube, in such a manner that when current is maximum in one tube, it is minimum in the other tube and vice versa, a signal potential source coupled to the control grid of the other of said tubes to vary the potential thereon in accordance with signals to control the state of conductivity of said tubes, a regenerative circuit coupling the electrodes of one of said tubes in an oscillation generating circuit, said regenerative circuit including a crystal of frequency $f1$ between the grid and cathode of one tube, a regenerative circuit coupling the electrodes of the other of said tubes in an oscillation generating circuit, said last-named regenerative circuit including a crystal of a frequency $f2$ between the grid and cathode of the other tube, and an output circuit coupled to the output electrodes of both of said tubes.

GEORGE L. USSELMAN.

REFERENCES CITED

The following references are of record in the file of this patent:

UNITED STATES PATENTS

| Number | Name | Date |
|---|---|---|
| 1,625,996 | Grondahl et al. | Apr. 26, 1927 |
| 2,033,948 | Lowell | Mar. 17, 1936 |
| 2,111,567 | Lowell | Mar. 22, 1938 |
| 2,186,544 | Koch | Jan. 9, 1940 |
| 2,304,388 | Usselman | Dec. 8, 1942 |
| 2,309,083 | Usselman | Jan. 26, 1943 |
| 2,375,527 | Crosby | May 8, 1945 |